United States Patent [19]

Huber

[11] 3,846,685

[45] Nov. 5, 1974

[54] TAPE PLAYER CARTRIDGE CONTROL CIRCUIT

[76] Inventor: William B. Huber, 233 Juniper, Park Forest, Ill. 60466

[22] Filed: Oct. 5, 1972

[21] Appl. No.: 295,150

Related U.S. Application Data

[62] Division of Ser. No. 80,263, Oct. 13, 1970, abandoned.

[52] U.S. Cl. .................................. 318/327, 318/345

[51] Int. Cl. .............................................. H02p 5/16

[58] Field of Search ............................ 318/326–328, 318/341, 345

[56] References Cited

UNITED STATES PATENTS

| | | | |
|---|---|---|---|
| 3,409,814 | 11/1968 | Azuma | 318/327 |
| 3,553,551 | 1/1972 | Arnold | 318/327 |
| 3,634,745 | 1/1972 | Agin | 318/327 |

*Primary Examiner*—Bernard A. Gilheany
*Assistant Examiner*—Thomas Langer
*Attorney, Agent, or Firm*—Mueller, Aichele & Ptak

[57] ABSTRACT

A tape player cartridge control system includes a speed control for operating the drive motor which transports the tape within a cartridge at a fixed speed, and includes circuit means to effect a fast forward condition of the tape under selected conditions when it is desired to advance the tape quickly to the next prerecorded selection on the tape. The speed control utilizes square waves from a one-shot multivibrator and square waves from an amplifier stage, and both square wave signals are applied out-of-phase to a matrix. When both square wave signals are of the same frequency, the output of the matrix is zero and the motor will run at a preset constant speed. The control system also includes an ejector circuit which automatically ejects the tape cartridge in accordance with an AND logic arrangement that occurs when the tape head is in the last track condition and the end-of-travel of the tape in the cartridge is sensed by a pair of contacts.

4 Claims, 2 Drawing Figures

TAPE PLAYER CARTRIDGE CONTROL CIRCUIT

This is a division, of application Ser. No. 80,263, now abandoned filed Oct. 13, 1970, now abandoned.

BACKGROUND OF THE INVENTION

This invention relates generally to control circuit means for operating a cartridge type tape player.

In a tape player employing a cartridge for storing the tape during the playing and non-playing periods, it is desirable that the tape cartridge be automatically ejected whenever the tape player is not in use. This relieves pressure on the capstan drive mechanism reducing the tendency of the capstan and/or drive wheel to develop a flat spot thereon. Such flat spots result in a reduced quality of sound reproduction. In a number of tape players, automatic ejection means are necessary in order for the cartridge to be in a position so that it can be removed. This is particularly true in certain automobiles where the tape player is mounted on or under the dashboard in such a manner that the cartridge is very difficult or impossible to remove.

Motor speed controls for tape players are of various forms, but in general are required always to maintain the rate of transport of the tape within the cartridge constant under all conditions. But high quality speed controls heretofore provided were relatively expensive. Furthermore, they often required complicated signal tachometer devices to produce a speed response feedback signal so that a predetermined speed could be maintained.

SUMMARY OF THE INVENTION

Accordingly, it is an object of this invention to provide an improved control circuit for operating tape cartridges of the type insertable into tape players for reproduction of audio signal information prerecorded on the tape.

Another object of this invention is to provide an improved ejector mechanism which will eject the cartridge in accordance with AND logic when both of the following occur, i.e., the last track on the tape is being played and the tape reaches its end-of-travel on that track.

Still another object of this invention is to provide an improved speed control for a tape player to transport the tape within the cartridge at a constant speed.

A feature of this invention is in the provision of a fast forward tape transport circuit which is selectively activated when an undesired music selection on the tape is being reproduced and hence the tape will advance quickly to a next music selection and stop automatically upon reaching it.

BRIEF DESCRIPTION OF THE DRAWINGS

FIGS. 1A and 1B are to be positioned next to each other with terminals 10*a*, 11*a* and 12*a* aligned with terminals 10*b*, 11*b* and 12*b*, respectively.

DETAILED DESCRIPTION OF THE PREFERRED EMBODIMENT

Figure 1A:
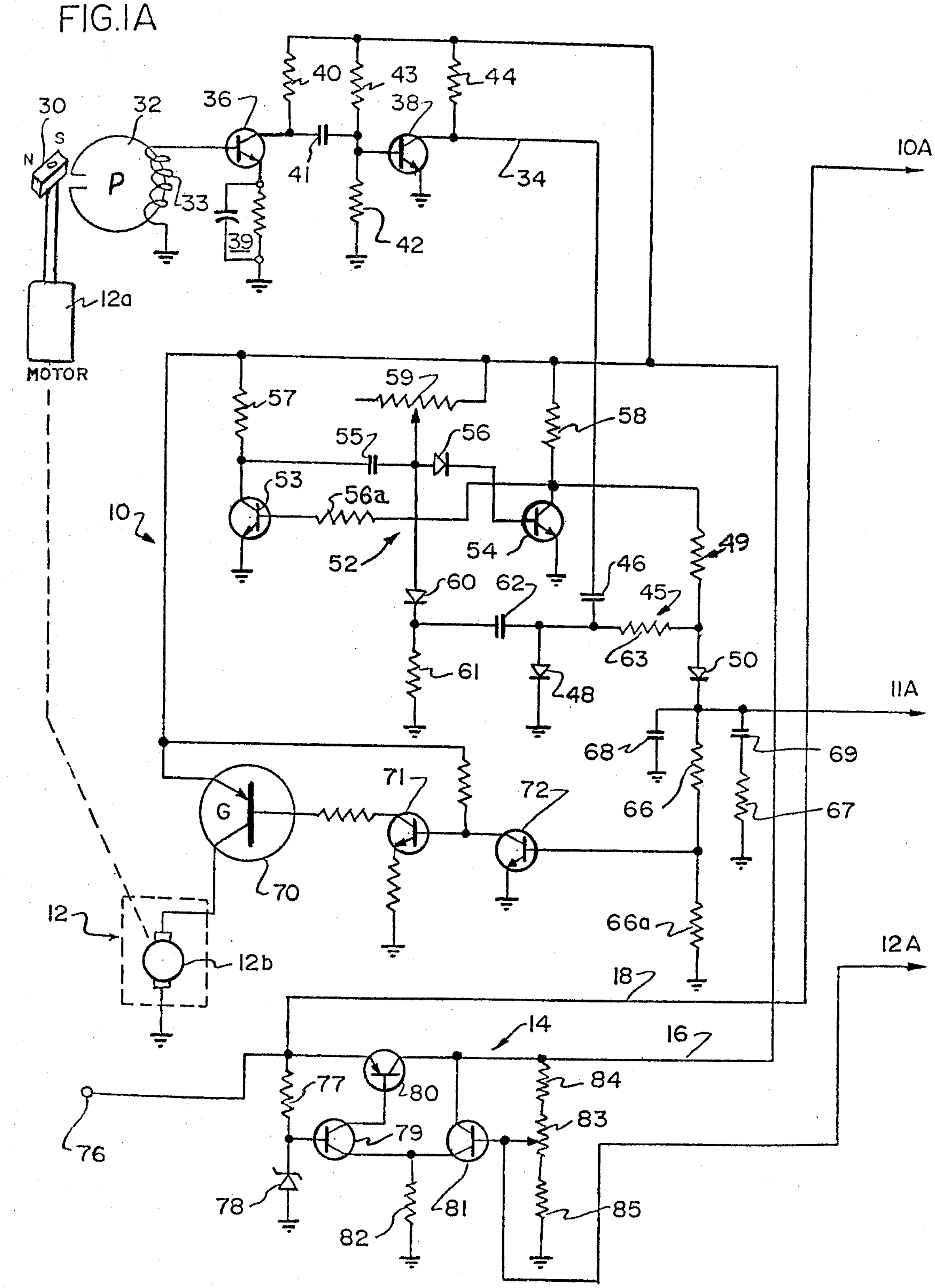
FIGS. 1A and 1B illustrate the detailed schematic diagram of the tape cartridge control circuit of this invention.
Figure 1B:
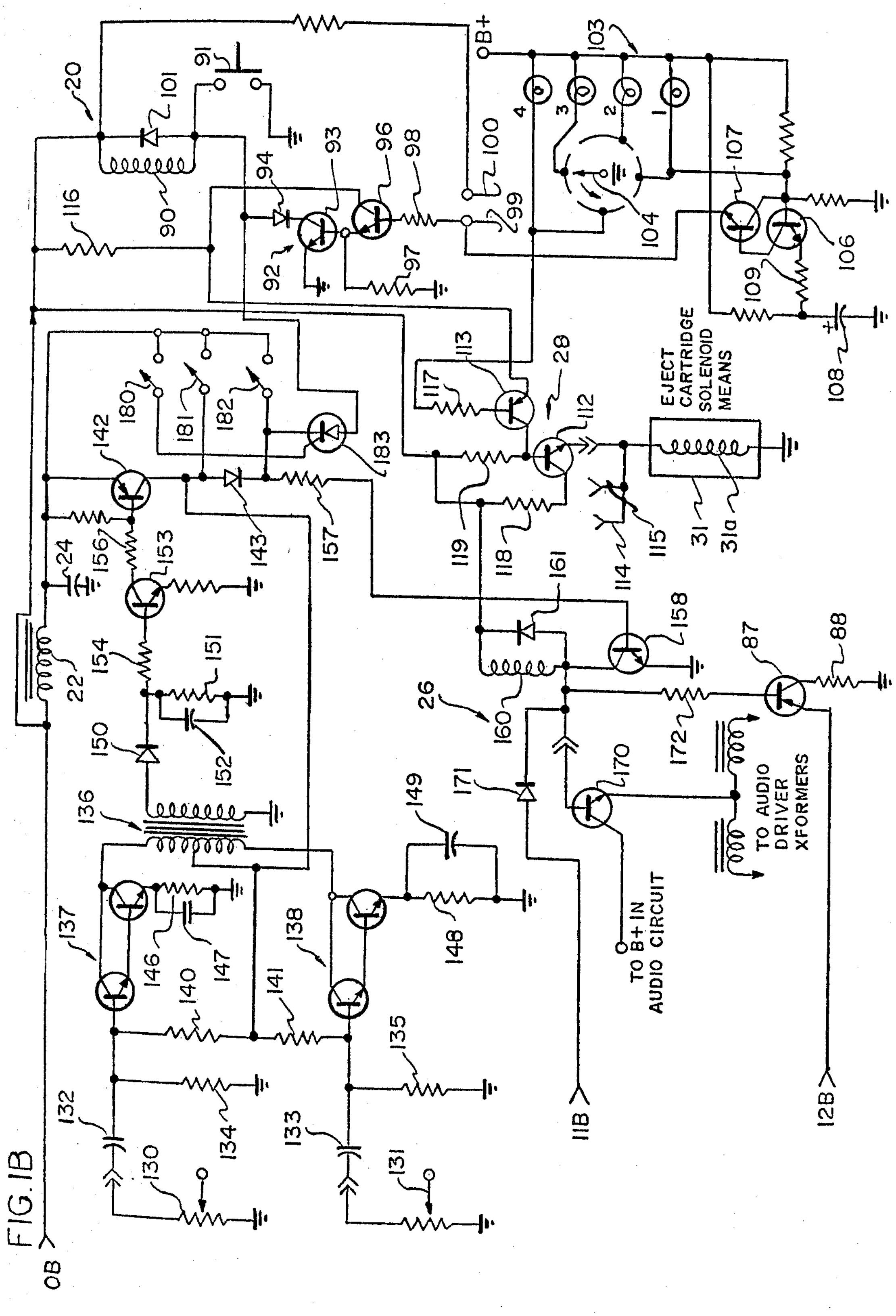

Referring now to the drawings, a detailed schematic diagram of a tape cartridge control system is illustrated and includes a motor control circuit which is designated generally by reference numeral 10 to control the speed of rotation of a DC motor 12. Power is applied to the motor control circuit 10 and motor 12 by way of a regulated supply designated generally by reference numeral 14. A regulated voltage, therefore, is supplied over a line 16 so that a predetermined motor speed will not change because of inadvertent variations. Unregulated voltage is applied over a line 18 through the connecting terminals 10*a* and 10*b*, of FIGS. 1A and 1B, respectively, to supply power to a tape head indexing solenoid circuit 20. This line also includes a filter circuit consisting of a choke 22 and a capacitor 24 to apply power to a fast forward solenoid circuit 26 which advances the magnetic tape within the cartridge at an increased rate when the user thereof does not want to listen to a particular selection, but wants to advance a tape to the next musical selection. Also included in the tape cartridge control system is an ejection circuit 28 which has ejector means 31 being primarily of a mechanical nature but including a cartridge eject solenoid 31*a* that will actuate the mechanical device to eject the cartridge from the play position automatically upon sensing any one of several predetermined conditions as well as upon sensing an AND logic condition. This AND logic condition is when the tape track being played is the last track position and when the tape within the cartridge reaches its end-of-travel. The ejector means 31 preferably is of the type disclosed in U.S. Pat. No. 3,439,184 issued to N. T. Neapolitakis and assigned to the same assignee.

The motor control circuit 10 includes a rotor member 12*a* which is associated with the motor 12 and which has supported thereon a magnet device 30 of any suitable configuration. Preferably, the magnet 30 may have 24 magnetic poles rotatable with the rotor 12*a* and positioned adjacent an inexpensive magnetic tape pick-up device 32 which produces pulses at an output winding 33 indicative of the speed of rotation of the rotor 12*a*. This arrangement eliminates the need for a complex and expensive tachometer device. Pulses induced in the pick-up are applied to an output line 34 after being amplified and clipped through a pair of transistors 36 and 38. The transistor 36 has a resistor-capacitor network 39 connected in the emitter circuit thereof and a current source resistor 40 is connected to the collector electrode thereof. The base electrode is biased as a result of signals received from the winding 33 of the pick-up 32. The signals are then coupled through a capacitor 41 to the base electrode of transistor 38, such that the signal developed across a resistor 42 is amplified and applied to the output line 34. Biasing resistor 43 and load resistor 44 are provided in a conventional circuit arrangement.

The pulses on line 34 are substantially square wave pulses due to the clipping or current limiting action of transistor 38. The time duration of these pulses is determined by the speed of rotation of the magnet 30 past the inductive pick-up 32, slow speed producing pulses having long time duration and the higher speeds producing pulses of shorter time duration. The pulses from the transistor 38 are applied to a matrix circuit 45 through a capacitor 46 which is of sufficiently large capacitance value so as to act as a low impedance to the full range of pulse widths passing therethrough. The matrix 45 includes a first diode 48 connected directly to ground and a second diode 50 connected to an RC network of resistor 67 and capacitors 68 and 69 which is a filter circuit serving to reduce or eliminate hunting of the system. Hence, the output of the matrix, after it passes through the diode 50, is allowed to vary, but only at a rate which does not allow hunting.

A one-shot multivibrator circuit 52 has a pair of transistors 53 and 54 cross-coupled in the usual manner through a capacitor 55 and a diode 56 between their respective collector and base electrodes, and a resistor 56a between their respective base and collector electrodes. Power is applied to the transistors 53 and 54 through resistors 57 and 58, respectively, and the time duration of the output pulse at the output of transistor 54 is controlled substantially by the setting of a potentiometer 59 coupled to the base electrode of transistor 54. The potentiometer 59 sets the RC time constant of the one-shot multivibrator and therefore, sets a predetermined speed for the motor 12. The polarity of the pulse from the one-shot multivibrator is opposite that of the pulse through capacitor 46. Since the leading edge of the pulse through the capacitor 46 and the leading edge of the output pulse from the one-shot multivibrator occur at the same time, it is the difference in the termination of these pulses that will determine the amount of power applied to the motor 12. By changing the termination point of the pulse from the one-shot multivibrator, a corresponding change in maximum motor speed is achieved.

The pulse through capacitor 46 also acts as the trigger pulse for the one-shot multivibrator 52 and to this end, the pulse is applied through a capacitor 62 and developed across a resistor 61 and coupled through a diode 60. This action will initiate the one-shot action of the multivibrator to produce an output pulse of a fixed time duration regardless of the time duration of the input or trigger pulse. The output signal from transistor 54 is applied through resistor 49 to the anode of diode 50. Also applied to the anode of diode 50 is the pulse from line 34, this taking effect through the capacitor 46 and a resistor 63. As mentioned above, these signals are opposite in polarity and thus add algebraically through the diode 50. That is, the negative pulse from transistor 38 and the positive pulse from transistor 54 are added at the anode of diode 50 and only the positive resultant voltage will pass through the diode since the diode will block any negative voltage. The resultant signal is applied to the resistor-capacitor network consisting of resistors 66, 66a and 67, and capacitors 68 and 69, which acts to filter the signal and reduce the possibility of hunting. When both of the square wave signals applied to the matrix are of the same time duration, or when the signal from line 34 is longer than that from the one-shot multivibrator, the output of the matrix diode is zero. At initial start-up of the motor, maximum torque is obtained by maximum conduction of a transistor 70, but as motor speed increases so also does the frequency of the pulses from the magnet 30 and pick-up 32. These pulses have a shortened duration and are combined with the pulses from the one-shot multivibrator to ultimately provide a positive signal and control the speed of rotation of the motor to a precise predetermined speed. The high current transistor 70 is controlled by a pair of cascade transistors 71 and 72 which act as current gain amplifiers. As the speed of rotation of the motor 12 increases to the desired speed, the positive signal through diode 50 is obtained. This positive signal is then applied to transistor 72 to render it conductive which, in turn, renders the transistor 71 less conductive to reduce current through transistor 70. Ultimately, the pulses produced by the magnet 30 and pick-up 32 are such that when combined with the output pulses from the one-shot multivibrator a steady current through the transistor 70 is achieved motor speed will reduce the time duration of the pulses from the pick-up 32 which, in turn, will allow the pulse from the one-shot multivibrator to take over and decrease the current through the transistor 70 to effect a decrease in motor speed. On the other hand, any decrease in motor speed and hence an increase in time duration of pulses from the pick-up 32, will cause a corresponding increase in the current through the transistor 70 to increase the motor speed.

The regulated power supply 14 receives power from a terminal 76, which may be connected to an automobile power supply, and delivers this initial voltage through a resistor 77 and a zener diode 78 which acts as a voltage reference circuit. The reference potential at the cathode of the zener diode 78 is applied to the base electrode of a transistor 79 which, in turn, is connected to the base electrode of a transistor 80 to supply current therethrough to the line 16 of a regulated potential. A third transistor 81 has its collector electrode connected to the collector electrode of transistor 80 and its emitter electrode connected to the emitter electrode of transistor 79 to form a shunt circuit therewith in series with a resistor 82. The transistor 81 has its base electrode connected to a potentiometer 83 which, in turn, is connected in series with resistors 84 and 85. The potentiometer 83 serves as a voltage adjustment to set the output voltage value of the regulated power supply 14. The base electrode of transistor 81 is also connected to a transistor 87, of FIG. 1B, through the terminal connection 12a, 12b. Transistor 87 includes a serially connected resistor 88 to limit current therethrough and serves to change the bias on transistor 81, of FIG. 1A, to change the supply voltage to the motor control circuit 10 in response to a fast forward signal developed within the fast forward relay circuit 26. That is, when the control circuit is manually selected to advance a tape within the cartridge at a high rate of speed so that a next musical selection can be quickly advanced and reproduced in the sound system, the bias on transistor 81 is also changed to accommodate an increased current for the corresponding increased tape speed. However, it will be understood that there may be several ways to accomplish fast forward transport of the magnetic tape.

The unregulated voltage from circuit line 18 passes through the terminal connections 10a and 10b, and is applied to the tape head indexing solenoid circuit 20 to provide an energizing current for the solenoid coil 90 either when a manually operated momentary switch 91 is actuated or when a transistorized circuit 92 is energized. The transistorized circuit 92 indicates the end-of-tape travel and includes a first transistor 93 with a diode 94 connected in series with the collector-emitter junction thereof and with the base electrode thereof connected to the collector-emitter circuit of a second transistor 96. The circuit point between the emitter of transistor 96 and the base of transistor 93 is connected to ground potential through a resistor 97 which normally biases the transistor 93 in an off condition. The transistor 96 has its base electrode connected through a resistor 98 to a contactor 99 which cooperates with a second contactor 100. A metal foil on the tape within the tape cartridge indicates the end-of-travel of the length of tape. This metal foil bridges the contacts 99 and 100 to apply a forward bias to the transistor 96 which, in turn, applies bias to transistor 93 to render it highly conductive to energize the solenoid coil 90. This action occurs at the end-of-travel of each track on the tape so that the magnetic tape head will index to the next track position on the tape. The solenoid coil 90 is shunted by a diode 101 which suppresses any tendency of oscillation within the solenoid coil when the transistor 93 rendered non-conductive.

An indicating circuit 103 is included and has a rotary switch 104 having its movable contactor connected to ground potential with the stationary contacts thereof connected to lamps designated by reference numerals 1, 2, 3 and 4 to designate the corresponding tracks on the magnetic tape within the cartridge. The track 1 position of the rotary switch 104 is also connected to the base electrode of a transistor 106 which, in turn, has its collector connected to the base electrode of a transistor 107. In the track 1 position of switch 104, the transistor 106 is biased off and the circuit will not oscillate. In any other position of the switch 104, the transistors 106 and 107 will oscillate because of the potential at the B+ terminal of the indicating circuit 103. This B+ voltage is obtained from a cartridge actuated switch, not shown, which may be a SPDT switch in the normally closed position. The emitter of transistor 106 is connected to a capacitor 108 through a resistor 109 which forms a charging circuit for the capacitor 108 momentarily to energize the transistor circuit 92 which, in turn, will energize the tape head indexing solenoid 90. This will assure that the tape head has been indexed to the track 1 position prior to insertion of the tape cartridge.

The cartridge ejector solenoid mechanism 31 is connected to the emitter electrode of a transistor 112 which has its base electrode connected to the collector electrode of a transistor 113 and these transistors form the AND logic ejector control circuit 28. Other terminals 114 and 115 are also connected to the emitter electrode of transistor 112 to provide additional means, not shown, for energizing the cartridge ejector solenoid 31, as for example, when the tape player is turned off, or when the operator merely desires to remove the cartridge. The ejector control circuit 28 receives power from the unfiltered line 18 through a resistor 116 which applies operating potential to the transistor 113. The base electrode of transistor 113 is tied back to the indicator switch 104 through a resistor 117, this connection being to the number 4 position which indicates that the last track on the tape is being played. The emitter electrode of transistor 113 is also tied back to the collector electrode of transistor 96 and is rendered conductive in response to the end-of-tape condition by a foil on the tape bridging the contactors 99 and 100, as is well-known in the art. When the movable contactor of switch 104 is in the number 4 position, and the number 4 light is on, this action will also place the base of transistor 113 at ground potential to constitute one part of the AND logic. The other circuit arrangement for the AND logic is the connection between the emitter of transistor 113 and the collector of transistor 93 which is rendered conductive upon shorting of contacts 99 and 100 by the metal foil on the tape. The AND logic arrangement afforded by this circuit is used to eject the cartridge when both the last track on the tape is being played and the end-of-tape travel is then sensed. Transistor 112 includes resistors 118 and 119 to bias the transistor in an off condition until such time as transistor 113 is rendered conductive.

The fast forward circuit 26 is operated in response to audio signal information received at volume control potentiometers indicated by reference numerals 130 and 131. These potentiometers are shown only connected in circuit with the fast forward speed control, but it will be understood that the movable contactor elements thereof are connected to the appropriate audio channels. The audio signal information is here used only to sense the presence of audio which is not to be reproduced in the audio system, but on the other hand advanced rapidly to a next selection. The audio free spacing between audio selections recorded on the tape provides a means for automatically stopping the fast forward condition at the end-of-travel of a particular musical selection so that the next musical selection on the tape will be reproduced for the listener. The time interval between musical selections is, in most cases, greater than 3 seconds at normal operating speeds. But at the increased speed for the fast forward operation this spacing is reduced to about 0.3 seconds. This 0.3 seconds spacing is sufficient to cause the fast forward circuit to become deactivated and return the tape speed back to normal in a manner to be described. If the next selection is not desirable, the fast forward circuit can again be activated rapidly to advance the tape to the next selection.

The audio signal information developed on the potentiometers 130 and 131 are applied through respective capacitors 132 and 133 and developed across resistors 134 and 135, respectively, and then applied to a mute and amplifier switching circuit. The mute and amplifier switching circuit has a transformer 136 with the ends thereof connected to transistor circuits 137 and 138. The primary winding of transformer 136 is center tapped which is connected back to a circuit point between a pair of resistors 140 and 141 and to the junction between an output transistor 142 and a diode 143. Connected to the emitter electrode of the final transistor in the transistor circuit 137 is a bypass network comprising a resistor 146 and a capacitor 147 which holds the transistor biased substantially as an audio amplifier. Similarly, the final transistor of the transistor circuit 138 has its emitter connected to ground potential through a resistor 148 and a capacitor 149. By connecting the mute amplifier and switch circuits to each channel, it is assured that should either channel eliminate audio therefrom, during the reproduction of a given selection of music, sufficient signal information will be obtained to continue the fast forward operation until the audio free space between selections is reached. The audio information is transformer coupled by the transformer 136 and rectified by a diode 150 and applied to a charging network comprising a resistor 151 and capacitor 152 which serves as the basic time constant for the fast forward operation. Preferably, the time constant of the resistor 151 and capacitor 152 is such that it will take approximately 0.3 seconds, and may be in the order of 200 micro-seconds, for the fast forward circuit 26 to deactivate when the absence of a signal is reached. So long as audio signal information is rectified by the diode 150, it will be applied to the base electrode of the transistor 153 through a resistor 154 and therefrom to the base electrode of transistor 142 through a resistor 156. This action will cause current flow to pass from the emitter-collector junction of transistor 142 through the diode 143 and a resistor 157 to the base electrode of a transistor 158 which, in turn, is connected in series with a fast forward solenoid 160. The fast forward solenoid 160 is shunted by a diode 161 to prevent extraneous oscillations when the transistor is rendered non-conductive. Upon energization of the solenoid 160, suitable means, such as motor speed or lever devices, may be activated to increase the speed of transport of the tape within the cartridge. This increased speed of the tape will continue as long as audio signal information is picked up at the top of the volume control potentiometers 130 and 131. At the end of the selection this signal information will be absent and the charging circuit, comprising resistor 151 and capacitor 152, will discharge at a rate sufficient to disable the fast forward circuit 26 before the next selection of the tape is reproduced.

To eliminate the audio signal at the loudspeaker during fast forward operation, the operating potential is removed from the driver transformers of the audio circuit by disabling a transistor 170 when the base electrode thereof goes substantially to ground potential which happens upon conduction of transistor 158. However, during normal operating conditions, a forward bias potential is applied to the base of the transistor 170 and through a resistor 172 to the base of the transistor 87. Only the primary windings of the audio driver transformers are here illustrated as being connected to the transistor 170 to show the disabling feature. Conduction of transistor 158 will also turn on the transistor 70 through the connectors 11*a* and 11*b* so that the motor 12 will operate at full speed for fast forward of the tape. This is in conjunction with the conduction of transistor 87 which disables the voltage regulator circuit 14 and applied full voltage on the motor 12.

To activate the fast foward circuit 26, a plurality of switches 180, 181 and 182 are utilized with the switch 180 being connected to the gate cathode circuit of a silicon controlled rectifier 183. No power is applied to silicon controlled rectifier 183 when the switch 91 is closed because the anode thereof is then a ground potential. Power is applied to the silicon controlled rectifier 183 only during conditions of non-energization of the head indexing solenoid 90 so that B+ potential, at low currents, can be delivered through the silicon controlled rectifier 183 to the base electrode of transistor 158 through the resistor 157. This current is sufficient to render transistor 158 highly conductive and energize the fast forward solenoid 160.

By way of example, momentary closure of the switch 180 energizes the silicon controlled rectifier 183 which continues to be energized during the rewind operation of the tape within the cartridge. On the other hand, switch 181 is used to initially energize the fast forward circuit 26 whereupon continual energization thereafter is caused by audio signals through the mute amplifier and switching circuits. This provides means for quickly passing up a particular selection on the tape and when the blank space between selections is reached, the fast forward condition automatically will be de-energized. On the other hand, the switch 182 is a jog switch which allows potential to be applied directly to the base electrode of transistor 158 to advance the tape in the cartridge any desired amount determined on the amount of time the jog switch 182 is held in the closed circuit condition.

Voltage to operate the amplifiers 137 and 138 is obtained through the center tap of the transformer 136 which has the center tap thereof connected to the switch 181. Voltage is also obtained by means of switch 180 when silicon controlled rectifier 183 is conductive. The operating voltage to transistors 137 and 138 is then held on by conduction of transistor 142 which, in turn, is held on by the audio signal passing through the circuit of diode 150 and transistor 153. When transistor 142 is rendered non-conductive as a result of the audio free space between selections, the operating voltage for amplifiers 137 and 138 is removed and the circuit will revert to its normal operating conditions.

What has been described is a novel circuit arrangement for operating tape cartridges and particularly provides means for constant speed control of the tape within the cartridge as well as means for ejecting the cartridge automatically upon sensing an AND logic condition at the end of the playing of the last track on the tape. Additionally, the circuit arrangement provides means for advancing the tape within the cartridge rapidly in a selective manner so that particular quantities of tape are not reproduced in the audio reproducing system.

I claim:

1. In a motor control circuit, the combination including:

a motor having an output shaft and winding means for receiving energizing current to cause rotation of said output shaft;

pulse generator means responsive to the speed of rotation of said output shaft to produce first pulses of one polarity having a time duration indicative of the speed of rotation with the time duration decreasing with increasing speed;

a current control device having load electrodes connected to said winding means to supply energizing current thereto, and further having a control electrode;

a one-shot multivibrator circuit means having an input terminal for receiving said first pulses from said pulse generator, said one-shot multivibrator circuit means producing second pulses of a polarity opposite said one polarity of said first pulses of predetermined time duration;

a matrix circuit;

circuit means coupling said first and second pulses to said matrix circuit for algebraically combining said first pulses from said pulse generator and said second pulses from said one-shot multivibrator circuit means to produce an output signal;

a unidirectional current conducting device connected to said matrix circuit; and bias control means coupled between said unidirectional current conducting device and said control electrode of said current control device to control conduction thereof in response to the polarity of said output signal from said matrix circuit thereby controlling the speed of rotation of said output shaft.

2. The control circuit according to claim 1 further including speed setting means associated with said one-shot multivibrator circuit means to vary the time duration of said second pulses thereby changing the preset speed of rotation of said output shaft.

3. The control circuit according to claim 1 wherein said current control device is a transistor having the emitter-collector junction thereof connected in series with said winding means and the control electrode thereof coupled to said bias control means.

4. The control circuit according to claim 1 wherein said pulse generator means is formed by rotatable magnet means secured to said output shaft of said motor and a magnetic pick-up is positioned adjacent said magnet means to produce said first pulses with a time duration indicative of the speed of rotation of said motor.

* * * * *

UNITED STATES PATENT OFFICE
CERTIFICATE OF CORRECTION

Patent No. 3,846,685 Dated November 5, 1974

Inventor(s) William B. Huber

It is certified that error appears in the above-identified patent and that said Letters Patent are hereby corrected as shown below:

On the cover sheet insert -- [73] Assignee: Motorola, Inc., Franklin Park, Ill. --.

Signed and sealed this 4th day of February 1975.

(SEAL)
Attest:

McCOY M. GIBSON JR.
Attesting Officer

C. MARSHALL DANN
Commissioner of Patents